Figure 1:
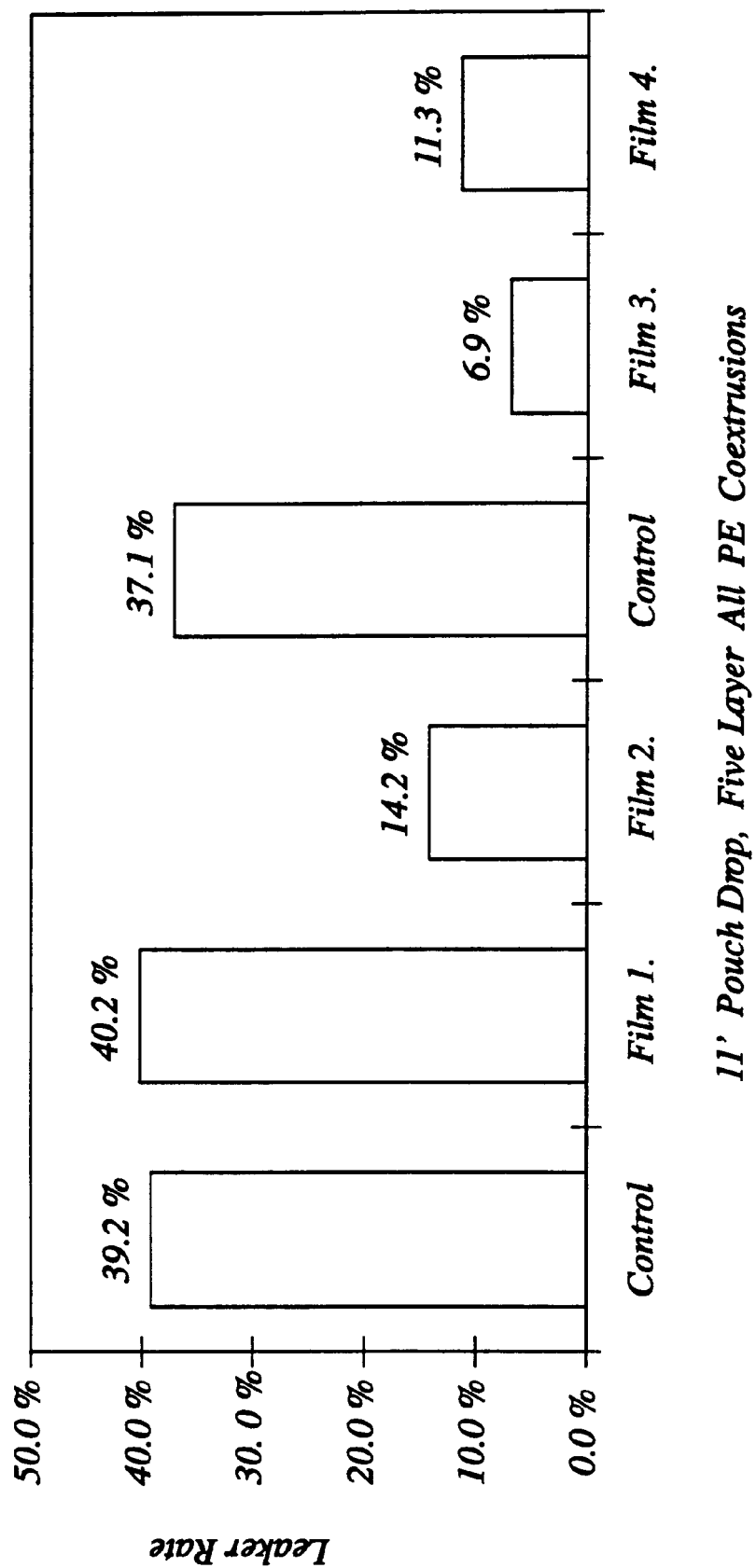

United States Patent
Breck et al.

[11] Patent Number: 5,972,443
[45] Date of Patent: Oct. 26, 1999

[54] MULTILAYER ETHYLENE COPOLYMER FILM

[75] Inventors: Alan Keith Breck; Alana Verdone, both of Kingston, Canada

[73] Assignee: Du Pont Canada Inc., Mississauga, Canada

[21] Appl. No.: 08/693,189

[22] PCT Filed: Feb. 8, 1995

[86] PCT No.: PCT/CA95/00064

§ 371 Date: Sep. 19, 1996

§ 102(e) Date: Sep. 19, 1996

[87] PCT Pub. No.: WO95/21743

PCT Pub. Date: Aug. 17, 1995

[30] Foreign Application Priority Data

Feb. 8, 1994 [GB] United Kingdom ............... 9402430

[51] Int. Cl.[6] .................. B29D 23/00; B32B 27/32; B32B 31/02

[52] U.S. Cl. .................. 428/35.2; 156/203; 428/36.91; 428/349; 428/355 EN; 428/516

[58] Field of Search .................. 428/349, 355 EN, 428/35.2, 36.91, 516; 156/203

[56] References Cited

U.S. PATENT DOCUMENTS

| | | |
|---|---|---|
| 4,521,437 | 6/1985 | Storms . |
| 5,206,075 | 4/1993 | Hodgson .................. 428/349 |

FOREIGN PATENT DOCUMENTS

| | | |
|---|---|---|
| 0580377 | 1/1994 | European Pat. Off. . |
| 0600425 | 6/1994 | European Pat. Off. . |
| 92/14784 | 9/1992 | WIPO . |
| WO92/14784 | 9/1992 | WIPO . |
| WO93/03093 | 2/1993 | WIPO . |
| 93/08221 | 4/1993 | WIPO . |
| WO93/08221 | 4/1993 | WIPO . |
| 94/06857 | 3/1994 | WIPO . |
| WO94/06857 | 3/1994 | WIPO . |
| 94/07954 | 4/1994 | WIPO . |
| WO94/07954 | 4/1994 | WIPO . |

*Primary Examiner*—Jenna Davis

[57] ABSTRACT

A multilayer film and a pouch containing a flowable material are disclosed. The multilayer film is made from two layers of a sealant film with an interposed layer of a polyethylene. The sealant film is made from a material comprising 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olephin having a density of from 0.900 to 0.930 g/cm$^3$ and a melt index of from 0.3 to 2.0 dg/min, a high-pressure polyethylene having a density of from 0.916 to 0.930 g/cm$^3$ and a melt index of from about 1 to 10 dg/min, and blends thereof. The polyethylene of the interposed layer is a high density polyethylene with a density of at least 0.930 g/cm$^3$ and a melt index of less than dg/min. The pouch is made from the multilayer film and has transversely sealed ends. The pouches are particularly useful in the packaging of flowable materials e.g. milk, especially using a vertical form, fill and seal apparatus.

30 Claims, 1 Drawing Sheet

11' Pouch Drop, Five Layer All PE Coextrusions

MULTILAYER ETHYLENE COPOLYMER FILM

The invention relates to ethylene copolymer film of improved stiffness and clarity, to multilayer ethylene copolymer film, to pouches formed from multilayer ethylene copolymer film and especially to such pouches filled with flowable materials, e.g. liquids. In particular embodiments, the pouches are made on so-called vertical form, fill and seal apparatus.

As used herein, the term "flowable material" does not include gaseous materials, but encompasses materials which are flowable under gravity or may be pumped. Such materials include liquids e.g. milk, water, fruit juice, oil; emulsions e.g. ice cream mix, soft margarine; pastes e.g. meat pastes, peanut butter; preserves e.g. jams, pie fillings, marmalade; jellies; doughs; ground meat e.g. sausage meat; powders e.g. gelatin powders, detergents; granular solids e.g. nuts, sugar; and like materials. The invention described herein is particularly useful for flowable foods e.g. milk. In addition, as used herein "density" is determined by ASTM Procedure D1505-85, "stiffness" is understood to be tensile modulus of elasticity as measured by ASTM Procedure D882-91 (Method A) and "melt index" by ASTM Procedure D1238-90B (Condition E). The "melting point" of a polymer is measured as the peak melting point when performing differential scanning calorimetry (DSC) as described in ASTM Procedure D3417-83 (rev. 88).

Aspects of the invention relate to the packaging of flowable materials e.g. milk, in pouches using for example a so-called vertical form, fill and seal apparatus. Using such an apparatus, a flat web of synthetic thermoplastic film is unwound from a roll and formed into a continuous tube in a tube-forming section, by sealing the longitudinal edges on the film together to form a so-called lap seal or a so-called fin seal. The tube thus formed is pulled vertically downwards to a filling station. The tube is then collapsed across a transverse cross-section of the tube, the position of such cross-section being at a sealing device below the filling station. A transverse heat seal is made, by the sealing device, at the collapsed portion of the tube, thus making an air-tight seal across the tube. The material being packaged enters the tube above the transverse heat seal in a continuous or intermittent manner, thereby filling the tube upwardly from the transverse heat seal. The tube is then allowed to drop a predetermined distance usually under the influence of the weight of the material in the tube. The jaws of the sealing device are closed again, thus collapsing the tube at a second transverse section, which may be at, above or below the air/material interface in the tube, depending on the nature of the material being packaged and the mode of operation of the process. The sealing device seals and severs the tube transversely at the second transverse section. The material-filled portion of the tube is now in the form of a pillow shaped pouch. Thus, the sealing device has sealed the top of the filled pouch, sealed the bottom of the next-to-be-formed pouch and separated the filled pouch from the next-to-be-formed pouch, all in one operation.

One vertical form, fill and seal apparatus of the type described above is a Prepac® IS-6 liquid packaging apparatus.

A sealing device commonly used is a so-called impulse sealer which has a sealing element mounted in sealing jaws and electrically insulated therefrom. In operation, the sealing jaws are closed and an electrical current is caused to flow through a sealing element e.g. a wire, for a fraction of the time that the jaws are closed. The jaws remain closed while the seal forms. Once the sealing jaws are open the synthetic thermoplastic film must be able to provide a transverse seal that supports the weight of the flowable material e.g. liquid, in the next-to-be-formed pouch.

Pouches made from ethylene/butene-1 copolymer films tend to suffer from defective seals i.e. a tendency to have weak transverse end and/or longitudinal seals even though the operating conditions of the impulse sealer have been optimized. Defective seals may lead to the phenomenon known as "leakers", in which the flowable material e.g. milk, may escape from the pouch through pinholes that develop at or close to the seal. It has been estimated that leakers account for about 1–2% of the 1.3 litre milk pouch production.

U.S. Pat. No. 4,521,437 of W. J. Storms, issued Jun. 4, 1985, discloses the use of pouches of ethylene/octene-1 copolymer film in the packaging of flowable materials; the film disclosed has a stiffness of about 30 000 psi when the polymer of the film has a density of 0.920 g/cm$^3$. That patent discloses that pouches made from the ethylene/octene-1 copolymer provide superior leaker performance, i.e., a lower percentage of leakers, compared with related films described above that are formed from linear ethylene/butene-1 copolymers. Further improvements in leaker performance may be achieved using film formed from a linear ethylene copolymer manufactured using a single-site polymerization catalyst. However, certain films made from the ethylene copolymers manufactured using the single-site polymerization catalyst may have lower stiffness than the film of Storm's patent. Lack of stiffness may adversely affect the runnability of the film on a form, fill and seal apparatus and gives poor stand-up properties for pouches in, for instance, a milk pitcher.

It has been found that the stiffness of film formed from polyethylene manufactured using a single-site polymerization catalyst may be increased in a manner that further improves the formation of pouches.

DRAWINGS

FIG. 1 shows leaker rate for a pouch drop test.

DESCRIPTION OF INVENTION

This invention provides for a skin of single-site catalyst films (SSC) and core layer of stiffer polymer such as high density polyethylene (HDPE). HDPE film used by itself, in the packaging industry tends to be hazy when viewed. It is desirable for such HDPE film when used in packaging to be clear, particularly when used to make pouches for milk in order to present a desirable looking produce for consumption. It has been found that the clarity of films, made with outer skins (on either side of the core layer) of SSC and a core layer of HPDE films, are improved.

The present invention provides for an ethylene co-polymer film having (a) a sealant film comprising a copolymer of ethylene and at least one $C_4$-$C_{10}$ alpha-olefin manufactured in a polymerization process using a single-site polymerization catalyst, and (b) a stiffening layer of polyethylene.

The stiffening layer of polyethylene is interposed between layers of the sealant film. The sealant film preferably has a density in the range of 0.86 to 0.94 g/cm$^3$ and a melt index of 0.2 to 10 dg/min and most preferably has a density in the range of 0.88 to 0.93 g/cm$^3$ and a melt index of 0.3 to 5 dg/min.

The sealant film further comprises at least one polymer selected from the group comprising a linear copolymer of ethylene and at least one $C_4$–$C_{10}$ alpha-olefin, a high pressure polyethylene and blends thereof. Preferably the sealant film composition comprises 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected by the group comprising a linear copolymer of ethylene and blends thereof. In particularly preferred embodiments, the composition comprises 20–100 and especially 50–100 parts of the copolymer obtained using the single site catalyst, and therefore conversely 0–80, and especially 0–50 parts, respectively of the other polymers specified above.

The thickness of the sealant film and interposed stiffening layer of polyethylene may vary in accordance with this invention. In one embodiment of this invention, for example, the thickness of the interposed stiffening layer of polyethylene is approximately one mil (or 25 microns) and the sealant film approximately one mil (or 25 microns), while in another embodiment, the thickness of the interposed stiffening layer of polyethylene is in the range of 5 to 110 microns with the total thickness of the film being in the range of 40 to 130 microns.

Moreover, other embodiments of the invention may have the thickness of the interposed stiffening layer of polyethylene between 5 and 50 microns or between 5 to 20 microns. Furthermore, the melt index of the interposed stiffening layer of polyethylene in other embodiments may be less than 1 dg/min.

The present invention also provides a multilayer polyethylene film formed from two layers of a sealant film and an interposed stiffening layer of polyethylene; said sealant film being made from a composition comprising 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin having a density of from 0.90 to 0.930 g/cm$^3$ and a melt index of from 0.3 to 2.0 dg/min, a high-pressure polyethylene having a density of from 0.916 to 0.930 g/cm$^3$ and a melt index of from about 1 to 10 dg/min, and blends thereof; said interposed stiffening layer of polyethylene being of a thickness in the range of 5 to 110 microns and being formed from polyethylene having a density of at least 0.93 g/cm$^3$ and a melt index of less than 5 dg/min; said laminate having a thickness of from 40 to 130 microns.

The present invention also provides a multilayer polyethylene film formed from two layers of a sealant film and an interposed stiffening layer of polyethylene; said sealant film being made from a composition comprising 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin having a density of from about 0.900 to 0.930 g/cm$^3$ and a melt index of from 0.3 to 10.0 dg/min, a high-pressure polyethylene having a density of from 0.916 to 0.930 g/cm$^3$ and a melt index of from about 1 to 10 dg/min, and blends thereof, said sealant film being selected on the basis of providing pouches with an $M_{11}$-test value that is lower, at the same film thickness, than that for pouches made with a film of a blend of 85 parts of a linear ethylene/octene-1 copolymer having a density of about 0.920 g/cm$^3$ and a melt index of about 0.75 dg/min and 15 parts of a high pressure polyethylene having a density of about 0.918 g/cm$^3$ and a melt index of 8.5 dg/min; said interposed stiffening layer of polyethylene being of a thickness in the range of 5 to 110 microns and being formed from polyethylene having a density of at least 0.93 g/cm$^3$ and a melt index of less than 5 dg/min; said laminate having a thickness of from 40 to 130 microns. The $M_{11}$ test is described below.

The present invention further provides a multilayer polyethylene film formed from a layer of a sealant film and a stiffening layer of polyethylene; said sealant film being made from a composition comprising 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin having a density of from 0.900 to 0.930 g/cm$^3$ and a melt index of from 0.3 to 2.0 dg/min, a high-pressure polyethylene having a density of from 0.916 to 0.930 g/cm$^3$ and a melt index of from about 1 to 10 dg/min, and blends thereof; said stiffening layer of polyethylene being of a thickness in the range of 5 to 110 microns and being formed from polyethylene having a density of at least 0.93 g/cm$^3$ and a melt index of less than 5 dg/min; said multilayer film having a thickness of from 40 to 130 microns.

The present invention additionally provides a film formed from two layers of a sealant film and an interposed stiffening layer of a film having a higher stiffness than the sealant layer, said layer of higher stiffness being formed from a polymer having a melting point of not more than 140° C.; said sealant film being made from a composition comprising 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin having a density of from 0.900 to 0.930 g/cm$^3$ and a melt index of from 0.3 to 2.0 dg/min, a high-pressure polyethylene having a density of from 0.916 to 0.930 g/cm$^3$ and a melt index of from about 1 to 10 dg/min, and blends thereof; said interposed stiffening layer of higher stiffness being of a thickness in the range of 5 to 110 microns and being formed from polyethylene having a density of at least 0.93 g/cm$^3$ and a melt index of less than 5 dg/min; said laminate having a thickness of from 40 to 130 microns.

The present invention also provides a multilayer film formed from a layer of a sealant film and a layer of a film having a higher stiffness than the sealant layer, said layer of higher stiffness being formed from a polymer having a melting point of not more than 140°; said sealant film being made from a composition comprising 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin having a density of from 0.900 to 0.930 g/cm$^3$ and a melt index of from 0.3 to 2.0 dg/min, a high-pressure polyethylene having a density of from 0.916 to 0.930 g/cm$^3$ and a melt index of from about 1 to 10 dg/min, and blends thereof; said layer of higher stiffness being of a thickness in the range of 5 to 110 microns; said multilayer film having a thickness of from 40 to 130 microns.

In preferred embodiments of the multilayer film of the present invention, the film has a stiffness of at least 20 000 psi ($\approx$135 Mpa), and especially at least 25 000 psi ($\approx$170 Mpa).

The present invention also provides a pouch containing a flowable material, said pouch being made from a multilayer film in tubular form and having transversely heat sealed ends, said multilayer polyethylene film being formed from two layers of a sealant film and an interposed stiffening layer of polyethylene; said sealant film being made from a composition comprising 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin having a density of from 0.900 to 0.930 g/cm$^3$ and a melt index of from 0.3 to 2.0 dg/min, a high-pressure polyethylene having a density of from 0.916 to 0.930 g/cm$^3$ and a melt index of from about 1 to 10 dg/min, and blends thereof; said interposed stiffening layer of polyethylene being of a thickness in the range of 5 to 110 microns and being formed from polyethylene having a density of at least 0.93 g/cm$^3$ and a melt index of less than 5 dg/min; said multilayer film having a thickness of from 40 to 130 microns.

The present invention also provides a pouch for containing a flowable material, said pouch being made from a multilayer film in tubular form and having transversely heat sealed ends, said multilayer polyethylene film being formed from two layers of a sealant film and an interposed stiffening layer of polyethylene; said sealant film being made from a composition comprising 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin having a density of from 0.900 to 0.930 g/cm$^3$ and a melt index of from 0.3 to 10.0 dg/min, a high-pressure polyethylene having a density of from 0.916 to 0.930 g/cm$^3$ and a melt index of from about 1 to 10 dg/min, and blends thereof, said sealant film being selected on the basis of providing pouches with an $M_{11}$-test value that is lower, at the same film thickness, than that for pouches made with a film of a blend of 85 parts of a linear ethylene/octene-1 copolymer having a density of about 0.920 g/cm$^3$ and a melt index of about 0.75 dg/min and 15 parts of a high-pressure polyethylene having a density of about 0.918 g/cm$^3$ and a melt index of 8.5 dg/min; said interposed stiffening layer of polyethylene being of a thickness in the range of 5 to 110 microns and being from from polyethylene having a density of at least 0.93 g/cm$^3$ and a melt index of less than 5 dg/min; said multilayer film having a thickness of from 40 to 130 microns.

In a preferred embodiment of the laminate and pouches of the present invention, the copolymer made with a single-site catalyst has a density in the range of 0.8–0.93 g/cm$^3$ especially in the range of 0.88 to 0.91 g/cm$^3$; and a melt index of less than 5 dg/min particularly in the range of 0.3 to 2 dg/min, and especially in the range of 0.5 to 1.5 dg/min.

In a further embodiment, the copolymer made with a single-site catalyst is an ethylene/butene-1 copolymer, an ethylene/hexene-1 copolymer, ethylene/octene-1 copolymer, ethylene/hexene-1/butene-1 terpolymer or an ethylene/octene-1/butene-1 terpolymer.

The present invention further provides a process for making pouches filled with a flowable material, using a vertical form, fill and seal apparatus, in which process each pouch is made from a flat web of film by forming a tubular film therefrom with a longitudinal seal and subsequently flattening the tubular film at a first position and transversely heat sealing said tubular film at the flattened position, filling the tubular film with a predetermined quantity of flowable material above said first position, flattening the tubular film above the predetermined quantity of flowable material at a second position and transversely heat sealing said tubular film at the second position, the improvement comprising making the pouches from a flat web of a film made from a multilayer film formed from two layers of a sealant film and an interposed stiffening layer of polyethylene; said sealant film being made from a composition comprising 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin having a density of from 0.900 to 0.930 g/cm$^3$ and a melt of from of from 0.3 to 2.0 dg/min, a high-pressure a density of from 0.916 to 0.930 g/cm$^3$ and a melt index of from about 1 to 10 dg/min, and blends thereof; said interposed stiffening layer of polyethylene being of a thickness in the range of 5 to 110 microns and being formed from polyethylene having a density of at least 0.93 g/cm$^3$ and a melt index of less than 5 dg/min; said multilayer film having a thickness of from 50 to 100 microns.

The present invention also provides, in a process for making pouches filled with a flowable material, using a vertical form, fill and seal apparatus, in which process each pouch is made from a flat web of film by forming a tubular film therefrom with a longitudinal seal and subsequently flattening the tubular film at a first position and transversely heat sealing said tubular film at the flattened position, filling the tubular film with a predetermined quantity of flowable material above said first position, flattening the tubular film above the predetermined quantity of flowable material at a second position and transversely heat sealing said tubular film at the second position, the improvement comprising making the pouches from a flat web of film made from a composite formed from two layers of a sealant film and an interposed stiffening layer of polyethylene; said sealant film being made from a composition comprising 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin having a density of from 0.900 to 0.930 g/cm$^3$ and a melt index of from 0.3 to 10.0 dg/min, a high-pressure polyethylene having a density of from 0.916 to 0.930 g/cm$^3$ and a melt index of from about 1 to 10 dg/min, and blends thereof, said sealant film being selected on the basis of providing pouches with an $M_{11}$-test value that is lower, at the same film thickness, than that for pouches made with a film of a blend of 85 parts of a linear ethylene/octene-1 copolymer having a density of about 0.920 g/cm$^3$ and a melt index of about 0.75 dg/min and 15 parts of a high-pressure polyethylene having a density of about 0.918 g/cm$^3$ and a melt index of 8.5 dg/min.

Although melt index ranges are specified herein, it is understood that the polymers have melt indices typical of film-grade polymers.

Although the invention may be a multilayer film of a sealant film and another layer, especially polyethylene, and the related pouches and process described herein, the invention will be particularly described with reference to a multilayer or composite of two layers of sealant film and an interposed stiffening layer of polyethylene film. The latter multilayer films are preferred because of the ability to form a lap seal as well as a fin seal and the substantial absence of curl in the laminate. In addition, although the non-sealant layer may be a layer of higher stiffness formed from a polymer having a melting point of not more than 140° C., that layer will be particularly described herein with reference to a layer of polyethylene.

The multilayer film is made, in part, from a composition comprising 10 to 100 parts by weight of a copolymer of a copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin having a density of from 0.900 to 0.930 g/cm$^3$ and a melt index of from 0.3 to 2.0 dg/min, a high-pressure polyethylene having a density of from 0.916 to 0.924 g/cm$^3$ and a melt index of from about 1 to 10 dg/min, and blends thereof. In embodiments, the composition comprises 20–100 and especially 50–100 parts of the copolymer obtained using the single site catalyst, and conversely 0–80 and 0–50 parts of the other polymer specified above.

The polyethylene of the interlayer may be a so-called high-pressure polyethylene or a so-called linear polyethylene, and blends thereof. In embodiments, the polyethylene is 0–100% by weight of a high density polyethylene, including high molecular weight high density polyethylene, preferably 20–100% by weight of such polyethylene and in particular 75–100% by weight of such polyethylene. The remainder of the polyethylene, if any, i.e., 0–80% by weight and especially 0–25% by weight, is a linear polyethylene or a recycled polyethylene obtained from any of a variety of sources provided that the recycled polyethylene meets the appropriate governmental or other regulations for packaging of the material that is to be packaged. The composition used for the interlayer (stiffening) needs to meet the density and melt index values specified herein viz. be a polyethylene having a density of at least 0.93 g/cm$^3$ and a melt index of less than 1 dg/min.

Processes for the manufacture of so-called high pressure polyethylene from ethylene monomer have been operated commercially for decades. A variety of such polymers are available. The high pressure polyethylene of the sealant layer has a density of 0.916 to 0.930 g/cm$^3$, especially 0.918 to 0.925 g/cm$^3$. In addition, the high pressure polyethylene has a melt index in the range of 1 to 10 dg/min. and especially in the range of 0.5 to 5 dg/min. For the interposed layer, the high pressure polyethylene would have a density and melt index in the range described herein.

Processes for the commercial manufacture of linear polyethylene have been known for more than thirty years. Such processes may be operated at temperature above the solubilization temperature of the polymer in which event the polymer remains in solution, or the processes may be operated below the solubilization temperature in which event the polymer remains as a slurry in the polymerization solvent. Processes are also known in which the polymerization is conducted in the gas phase in the absence of solvent. Other processes operate at both high temperature and high pressure. The catalysts used are frequently based on titanium and are referred to as coordination catalysts; such catalysts may also be described as multi-site catalysts or heterogeneous catalysts. The polymer obtained is linear in nature, as opposed to the branched nature of high pressure polyethylene. Linear low density polyethylene is obtained by the co-polymerization of ethylene with at least one $C_4$–$C_{10}$ alpha-olefin hydrocarbon comonomer, examples of which include butene-1, hexene-1 and octene-1. The linear low density polyethylene has a density in the range of 0.900 to 0.930 g/cm$^3$, preferably 0.912 to 0.930 g/cm$^3$ and especially in the range of 0.918 to 0.925 g/cm$^3$. In addition the polymer has a melt index in the range of 0.3 to 10.0 dg/min, preferably 0.3 to 2.0 dg/min and especially in the range of 0.5 to 1.5 dg/min.

The high density polyethylene has a density of at least 0.930 g/cm$^3$, especially in the range of 0.935–0.965 g/cm$^3$. Similarly, the high density polyethylene has a melt index of less than 1 dg/min and especially in the range of 0.01 to 0.3 dg/min; polymer in the lower end of that range may be classified as high molecular weight polyethylenes. The high density polyethylene may be high pressure polyethylene or linear polyethylene.

The ethylene copolymer made with single-site catalyst may be obtained using a variety of polymerization processes of the type described above for the manufacture of linear low density polyethylene e.g. processes that operate in solution, in the gas phase and as a slurry process; references to the use of single site catalysts in polymerization processes is made in Modern Plastics, p.15, May 1993, Plastics Focus Vol. 25, No. 12, Jun. 21, 1993 and in Exxon Chemical Exact Facts, Vol.1, No. Feb. 1, 1993. Such polymers are obtained by the co-polymerization of ethylene with at least one $C_4$–$C_{10}$ alpha-olefin hydrocarbon comonomer, examples of which include butene-1, hexene-1 and octene-1. The catalyst used is a so-called single-site catalyst, certain of which may also be referred to as metallocene or constrained geometry catalysts.

By the term "single-site catalyst" is meant a metallocene or constrained geometry catalyst. Metallocene catalysts are organometallic co-ordination compounds obtained as a cyclopentadienyl (Cp) derivative of a transition metal or metal halide. The metal is bonded to the Cp ring by electrons moving in orbitals extending above and below the plane of the ring (pi bond). Metallocene catalysts systems are extremely sensitive to the geometry of the catalytic site at the transition metal (the "single-site"). Examples of single-site catalysts include $Cp_2TiCl_2$, $Cp_2ZrCl_2$, $Cp_2HfCl_2$, $(C_5(CH_3)_2)_3TiCl_2$, $PH_2Me$ $(Ind)_2ZrCl_2$, $[Me_4Cpsi(Me)_2N(t-Bu)]TiCH_2[o-PhN(Me_2)]$, $Cp_2Fe$ $B(C_2F_2)_4$.

The polyethylene obtained with the single site catalyst preferably has a density in the range of 0.8 to 0.93 g/cm$^3$, moreover in the range of 0.88 to 0.930 g/cm$^3$, and especially in the range of 0.89 to 0.910 g/cm$^3$. In addition the polymer preferably has a melt index of less than 5 dg/min, particularly in the range of 0.3 to 2.0 dg/min and especially in the range of 0.5 to 1.5 dg/min. Preferred polymers include ethylene/butene-1, ethylene/hexene-1, ethylene/octene-1 and ethylene/hexene-1/butene-1 terpolymers.

The multilayer polyethylene film in one embodiment has a thickness of 40 to 130 microns, and especially in the range of 50 to 100 microns. In particular embodiments e.g. for use on a form, fill and seal apparatus, the laminate thickness is preferably in the range of 50 to 70 microns. The sealant layers on opposed sides of the interposed polyethylene layer are preferably of substantially equal thickness, although this is not essential provided that the requirements for the intended end-use are met, to allow the film to be reversed and/or opposing sides to be bonded together as in a tube. The interposed layer has a thickness of 5 to 110 microns, in one embodiment 5 to 50 microns and especially 8 to 16 microns in other embodiments.

The $M_{11}$-test is as follows: In general terms, the $M_{11}$-test is a drop test carried out on 1.3 litre water-filled pouches. In the test, pouches containing 1.3 litres of water, at a temperature of 10±5° C., are made from a 32 cm. wide film web, on a Prepac IS-6 vertical form, fill and seal apparatus. The web of film is formed into a continuous tube with a lap seal, said tube having an inside diameter of approximately 9.8 cm. A typical vertical sealing jaw of the Prepac IS-6 apparatus has an approximately 3.5 by 0.3 mm rectangular sealing wire made of Nichrome® alloy, and a transverse sealing jaw with an approximately 1.8 by 0.7 mm sealing wire made of Nichrome® alloy. The operation of the vertical and transverse sealing element should be optimized for the particular film type and thickness used. Typically, during vertical sealing of the tube, a 35–50 amp current at 14–24 volts is passed through the sealing wire for about 0.2–0.5 seconds. The force applied by the vertical sealing jaws to the film is about 8 N applied for a dwell time of about 0.9 seconds. The vertical sealing jaw is cooled by water at 13°±6° C. During transverse sealing of the tube, a 35–55 amp current at 10–15 volts is passed through the sealing wire for about 0.2–0.5 seconds. The force applied by the transverse sealing jaws to the film is about 19 N applied for a dwell time of about 0.9 seconds. The transverse sealing jaw is cooled by water at 13°±6° C. Both sealing jaws are covered with 150 μm thick glass fiber tape impregnated with Teflon® polytetrafluoroethylene resin. With respect to optimizing the sealing operations, it will be recognized that the sealing conditions (e.g. amperage, voltage, dwell time) depend on the gauge and melting characteristics of the film. For example, a 50 μm film would require lower amperage and voltage, as controlled by the rheostat on the apparatus, than would a 75 μm film. Typically such a change in film thickness requires an adjustment of approximately 10% of the rheostat range.

The water-filled pouches containing the cold water, are dropped onto a concrete floor from a height of 335 cm. The pouches are positioned with the longitudinal axis of the tube i.e. pouch, coincident with an imaginary vertical line.

Any pouch from which water flows or weeps after the pouch has been dropped onto the floor, is termed a "leaker". The number of leakers, expressed as a percentage of the total number of pouches dropped is the $M_{11}$-test value for the particular film being tested. It will be noted that the $M_{11}$-test value will be affected by the thickness of the film as well as the material from which the film is made.

As noted above, it is the sealant film that is selected upon the basis of a drop test such as the $M_{11}$-test. It is to be understood, therefore, that pouches made with other pouch-forming apparatus come within the scope of the present invention.

The blends useful in the present invention may be made by blending the constituents prior to feeding to the hopper of a film extruder, or may be made by blending the constituents at the time of extrusion just prior to remelting in the extruder, or alternatively the constituents may be melt blended in the extruder.

The ethylene/α-olefin copolymer or blend of ethylene/α-olefin copolymer e.g. in pellet form, may be fed into a film extruder and extruded into film form using known techniques. One preferred method of manufacturing film is the so-called blown film process disclosed in Canadian Patent No. 460 963 issued Nov. 8, 1949 to E. D. Fuller. Another preferred method of manufacturing film uses an internal or external cooling mandrel in the blown film process, as disclosed for example in Canadian Patent No. 893 216 issued Feb. 15, 1972 to M. Bunga and C. V. Thomas.

The film, after manufacture, is slit longitudinally into appropriate widths. The width is selected on the basis of the diameter of the tube to be formed on the vertical form, fill and seal apparatus.

The preferred method of manufacture of a multilayer film is by using a blown film coextrusion process, although other methods of manufacture of the film may be used.

It will be understood by those skilled in the art that additives e.g. UV stabilizers, anti-block agents, slip additives, may be added to the polymers from which the pouches of the present invention are made.

The pouches of the present invention may be used in the packaging of flowable materials e.g. liquids, as defined above. In particular, the pouches may be used in the packaging of milk.

The multilayer film of the invention is particularly useful in the formation of pouches, especially using a form, fill and seal apparatus. In particular, the multilayer film provides increased stiffness, compared to the monolayer sealant film, increased clarity compared to HDPE film, and further improves efficiencies in the runnability of monolayer sealant films as described herein.

The multilayer film may be used in the formation of pouches, for the packaging of flowable materials. In particular, the multilayer film may be used in the packaging of milk using a form, fill and seal apparatus.

EXAMPLE

Introduction

Films were made on a five-layer blown film coextrusion line. The line consists of five extruders (A through E) feeding on an eight inch diameter circular die. The two "skin layer" extruders A and E were 2.5" (≈65 mm) single-screw extruders, while the three "core" extruders B, C and D were 2" (≈50 mm). The line includes an oscillating nip, corona treater, edge guide and a back-to-back winder with slit-in-line, capable of surface-driven or centre-driven winding. The width of the tower nip and winder also allow for blow-up ratios up to about 4:1.

Film Extrusion

Formulations for the skin and core layers were preblended. A control linear low density polyethylene (LLDPE)/low density polyethylene (LDPE) blend, two single-site catalyst polymer formulations, and two high density polyethylenes were chosen:

| | |
|---|---|
| Control | 85% Sclair 11L4B octene LLDPE, density = 0.920 g/cc, M.I. = 0.75 |
| | 15% Nova LF0521A LDPE, density = 0.921 g/cc, M.I. = 5.0 |

-continued

Single Site Catalyst Film (SSC)

SSC #1　52.5% Exact 3028 butene copolymer mPE, 0.900 g/cc density, M.I. = 1.20
40% Exact 4011 butene copolymer mPE, 0.887 g/cc density, M.I. = 2.20
3.4% Duex 8876 slip/antiblock concentrate
0.1% MB35102 antiblock concentrate
4.0% SAX 7401 extrusion aid concentrate
(mPE means metallocene polyethylene)

SSC #2　92.5% Exact 3033, butene-hexene terpolymer mPE, 0.900 g/cc density, M.I. = 1.20
3.4% Duex 8876 slip/antiblock concentrate
0.1% MB35102 antiblock concentrate
4.0% SAX 7401 extrusion aid concentrate HDPE #1　Sclair 16A, 0.945 g/cc density, M.I. = 0.28
HDPE #2　Sclair 19C, 0.957 g/cc density, M.I. = 1.00

| Film | Layer A (outermost) 1.0 mil | Layer B 0.3 mil | Layer C 0.4 mil | Layer D 0.3 mil | Layer E (innermost) 1.0 mil |
|---|---|---|---|---|---|
| Control | 85% Sclair 11L4B 15% Nova LF0521A | 85% Sclair 11LAB 15% Nova LF0521A | 85% Sclair 11LAB 15% Nova LF0521A | 85% Sclair 11LAB 15% Nova LF0521A | 85% Sclair 11L4B 15% Nova LF0521A |
| Film 1 | SSC #1 (Exact 3028-Exact 4011 blend) | 85% Sclair 11L4B 15% Nova LF0521A | 85% Sclair 11L4B 15% Nova LF0521A | 85% Sclair 11L4B 15% Nova LF0521A | SSC #1 (Exact 3028-Exact 4011 blend) |
| Film 2 | SSC #1 (Exact 3028-Exact 4011 blend) | Sclair 19C HDPE | Sclair 19C HDPE | Sclair 19C HDPE | SSC #1 (Exact 3028-Exact 4011 blend) |
| Film 3 | SSC #2 (Exact 3033) | 85% Sclair 11L4B 15% Nova LF0521A | Sclair 16A HDPE | 85% Sclair 1IL4B 15% Nova LF0521A | SSC #2 (Exact 3033) |
| Film 4 | SSC #2 (Exact 3033) | 85% Sclair 11L4B 15% Nova LF0521A | Sclair 19C HDPE | 85% Sclair 11L4B 15% Nova LF0521A | SSC #2 (Exact 3033) |

All of the above identifiers are either trade-marks or designations available in the trade.

The control film was made at a blow up ratio of 2:1. The other films were made at a blow up ratio of 3:1. The films were would as a flattened tube and slit to a narrower width.

Film Testing

The films were run on the Prepac IS-6 filler to assess runnability, to make pouches for evaluating in a pitcher, and to make pouches for a pouch drop test.

| Film | Runnability of IS-6 filler | Pouch-in-pitcher |
|---|---|---|
| Control | good slip good pouch length | stands up after opening doesn't fold over edge of pitcher when pouring |
| Film 1 | good slip some drag on forming plates | stiffness improved relative the SCC film referred to below |
| Film 2 | pouch length variation, i.e. long–short | good stiffness |
| Film 3 | very good slip properties | very similar to control |
| Film 4 | very good slip properties | very similar to control |
| Previous all-SSC films, | pouch length variation, i.e. pouches get shorter and shorter | pouch tends to fold over edge of pitcher when |

-continued

| Film | Runnability of IS-6 filler | Pouch-in-pitcher |
|---|---|---|
| such as Exact 3033, Dow Affinity PL1880 | | pouring, and stays there |

For the pouch drop test, films were made into 1.3 litre water-filled pouches. For each pouch drop test, approximately 200 pouches were dropped on end from eleven feet onto a concrete floor. Results of the pouch drop impact test are shown in FIG. 1.

Analysis

From the results one can conclude that combining a core of HDPE with skin layers of a single-site or metallocene-catalyst polymers makes a film with improved clarity; adequate stiffness to run well on the existing IS-6; and good pouch drop impact resistance.

A structure such as these with mPE on the skin layers and other polymers in the core would have the advantage of the mPE's lower temperature sealing on the vertical seal.

What is claimed is:

1. A multi-layer film for use in making pouches for containing flowable materials and having at least two heat sealed edges comprising at least one single-site catalyst sealant polymer layer and at least one stiffening layer of high density polyethylene being of greater stiffness than the single site catalyst polymer layer, the multi-layer film has a stiffness of at least about 20,000 psi (approx. 135 MPa), and the stiffening layer has a thickness in the range of 5 to 110 microns, and the multi-layer film has a thickness of 40 to 130 microns.

2. The multi-layer film as claimed in claim 1 wherein the stiffening layer is a polyethylene having a density of at least 0.930 g/cm$^3$ and a melt index of less than 1 dg/min.

3. A multi-layer film as claimed in claim 1 wherein the stiffening layer has a thickness in the range of 5 to 50 microns, and said film has a thickness of 50 to 100 microns.

4. A multi-layer film as claimed in claim 1 wherein the stiffening layer has a thickness in the range of 8 to 16 microns, and said film has a thickness of 50 to 70 microns.

5. A multi-layer film as claimed in claim 1 wherein the stiffening layer of polyethylene has a stiffness of at least about 25,000 psi (approx. 170 MPa).

6. A multi-layer film as claimed in claim 1 wherein the sealant polymer layer comprises 10 to 100 parts by weight of said copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin; a high pressure polyethylene; and blends thereof.

7. The multi-layer film of claim 1 in which the copolymer made with a single-site catalyst has a density in the range of 0.8–0.93 g/cm$^3$, and a melt index of less than 5 dg/min.

8. The multi-layer film of claim 1 in which the copolymer made with a single-site catalyst is selected from ethylene/butene-1 copolymers, ethylene/hexene-1 copolymers, ethylene/octene-1 copolymers, ethylene/octene-1/butene-1 terpolymers and ethylene/hexene-1/butene-1 terpolymers.

9. A multi-layer polyethylene film as claimed in claim 1 for use in making pouches for containing flowable materials and having at least two heat sealed edges comprising the following layers in order of outermost layer to innermost layer:

Layer A: a single-site catalyst ethylene polymer film or a film made from blends containing such a polymer;

Layer B: a LLDPE or a blend of LLDPE with a high pressure polyethylene;

Layer C: a high density polyethylene;

Layer D: same composition as Layer B;

Layer E: same composition as Layer A;

and the multi-layer film has a thickness of from 40 to about 130 microns and a stiffness of at least about 20,000 psi (approx. 135 MPa).

10. A multi-layer film as claimed in claim 9 wherein layer A and Layer E are each about 25 microns thick; Layer B and Layer D are each about 8 microns thick; and Layer C is about 10 microns thick.

11. A multi-layer polyethylene film formed from two layers of a sealant film and an interposed stiffening layer of polyethylene, said sealant film being made from a composition comprising 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin having a density of from 0.8 to 0.930 g/cm$^3$ and a melt index in the range of 0.3 to 10.0 dg/min, a high-pressure polyethylene having a density of from 0.916 to 0.930 g/cm$^3$ and a melt index of from about 1 to 10 dg/min, and blends thereof; said interposed stiffening layer of polyethylene being of a thickness in the range of 5 to 110 microns and being formed from polyethylene having a density of at least 0.93 g/cm$^3$ and a melt index of less than 5 dg/min, said multi-layer film having a thickness of from 40 to 130 microns and a stiffness of at least about 20,000 psi (approx. 135Mpa).

12. A pouch for containing a flowable material, having at least two heat sealed edges, made from a multi-layer film comprising at least one single-site catalyst sealant polymer layer and at least one stiffening layer of high density polyethylene being of greater stiffness than the single-site catalyst polymer layer, the multi-layer film has the stiffness of at least about 20,000 psi (approx. 135 MPa), and the stiffening layer has a thickness in the range of 5 to 110 microns, and the multi-layer film has a thickness of 40 to 130 microns.

13. A pouch as claimed in claim 12 wherein the sealant polymer layer comprises 10 to 100 parts by weight of said copolymer of ethylene and at least one $C_4$–$C_{10}$ alpha-olefin manufactured in a single-site catalyst polymerization process and from 0–90 parts by weight of at least one polymer selected from the group comprising a linear copolymer of ethylene and at least one $C_4$–$C_{10}$ alpha-olefin; a high pressure polyethylene; and blends thereof.

14. A pouch as claimed in claim 13 in which the copolymer made with a single-site catalyst is selected from ethylene/butene-1 copolymers, ethylene/hexene-1 copolymers, ethylene/octene-1 copolymers, ethylene/octene-1/butene-1 terpolymers and ethylene/hexene-1/butene-1 terpolymers.

15. A pouch as claimed in claim 12 which has a stiffness of at least about 25,000 psi (approx. 170 MPa).

16. A pouch as claimed in claim 12 in which the copolymer made with a single-site catalyst has a density in the range of 0.8–0.93 g/cm$^3$, and a melt index of less than 5 dg/min.

17. A pouch as claimed in claim 12 wherein the stiffening layer is a polyethylene having a density of at least 0.930 g/cm$^3$ and a melt index of less than 1 dg/min.

18. A pouch as claimed in claim 12 wherein the stiffening layer has a thickness in the range of 5 to 50 microns, and said film has a thickness of 50 to 110 microns.

19. A pouch as claimed in claim 12 for containing flowable material comprising the following layers in order of outermost layer to innermost layer:

Layer A: a single-site catalyst ethylene polymer film or a film made from blends containing such a polymer;

Layer B: a LLDPE or a blend of LLDPE with a high pressure polyethylene;

Layer C: a high density polyethylene;

Layer D: same composition as Layer B;

Layer E: same composition as Layer A;

and the multi-layer film has a thickness of from 40 to about 130 microns and a stiffness of at least about 20,000 psi (approx. 135 MPa).

20. A pouch as claimed in claim 19 wherein Layer A and Layer E are each about 25 microns thick; Layer B and Layer D are each about 8 microns thick; and Layer C is about 10 microns thick.

21. A multi-layer polyethylene pouch formed from a layer of a sealant film and a stiffening layer of polyethylene, said sealant film being made from a composition comprising 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin having a density of from 0.8 to 0.930 g/cm$^3$ and a melt index of from 0.3 to 10.0 dg/min, a high-pressure polyethylene having a density of from 0.916 to 0.930 g/cm$^3$ and a melt index of from about 1 to 10 dg/min, and blends thereof; said interposed stiffening layer of polyethylene being of a thickness in the range of 5 to 110 microns and being formed from polyethylene having a density of at least 0.93 g/cm$^3$ and a melt index of less than 5 dg/min; said multi-layer film having a thickness of from 40 to 130 microns, and the multi-layer film has a stiffness of at least about 20,000 psi (approx. 135 Mpa).

22. A process for making pouches filled with a flowable material, using a vertical form, fill and seal apparatus, in which process each pouch is made from a flat web of film by forming a tubular film therefrom with a longitudinal seal and subsequently flattening the tubular film at a first position and transversely heat sealing said tubular film at the flattened position, filling the tubular film with a predetermined quantity of flowable material above said first position, flattening the tubular film above the predetermined quantity of flowable material at a second position and transversely heat sealing said tubular film at the second position, the improvement comprising making the pouches from a flat web of film made from a multi-layer film comprising at least one single-site catalyst sealant polymer layer and at least one stiffening layer of high density polyethylene being of greater stiffness than the single-site catalyst polymer layer, the multi-layer film has the stiffness of at least about 20,000 psi (approx. 135 MPa), and the stiffening layer has a thickness in the range of 5 to 110 microns, and the multi-layer film has a thickness of 40 to 130 microns.

23. A process for making pouches as claimed in claim 22 wherein the multi-layer film has a stiffness of at least about 25,000 psi (approx. 170 MPa).

24. A process as claimed in claim 22 wherein the heat sealing is accomplished by impulse sealing.

25. A process for making pouches as claimed in claim 22 wherein the stiffening layer is a polyethylene having a density of at least 0.930 g/cm$^3$ and a melt index of less than 1 dg/min.

26. A process for making pouches as claimed in claim 22 wherein the sealant polymer layer comprises 10 to 100 parts by weight of said copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin; a high pressure polyethylene and blends thereof.

27. A process for making pouches as claimed in claim 22 wherein the copolymer made with a single-site catalyst has a density in the range of 0.8–0.93 g/cm$^3$, and a melt index of less than 5 dg/min.

28. A process for making pouches as claimed in claim 22 wherein the copolymer made with a single-site catalyst is selected from ethylene/butene-1 copolymers, ethylene/hexene-1 copolymers, ethylene/octene-1 copolymers, ethylene/octene-1/butene-1 terpolymers and ethylene/hexene-1/butene-1 terpolymers.

29. A process for making pouches as claimed in claim 22 wherein said sealant film being made from a composition comprising 10 to 100 parts by weight of a copolymer of ethylene and at least one $C_4$–$C_{10}$ alpha-olefin manufactured in a polymerization process using a single-site polymerization catalyst and from 0 to 90 parts by weight of at least one polymer selected from the group consisting of a linear copolymer of ethylene and at least one $C_4$–$C_{10}$ alpha-olefin having a density of from 0.8 to 0.930 g/cm$^3$ and a melt index in the range of 0.3 to 10.0 dg/min, a high-pressure polyethylene having a density of from 0.916 to 0.930 g/cm$^3$ and a melt index of from about 1 to 10 dg/min, and blends thereof; said interposed stiffening layer of polyethylene being of a thickness in the range of 5 to 110 microns and being formed from polyethylene having a density of at least 0.93 g/cm$^3$ and a melt index of less than 5 dg/min, said multilayer film having a thickness of from 40 to 130 microns and a stiffness of at least about 20,000 psi (approx. 135 Mpa).

30. A process for making pouches as claimed in claim 22 wherein the film comprises the following layers in order of outermost layer to innermost layer:

Layer A: a single-site catalyst ethylene polymer film or a film made from blends containing such a polymer Layer B: a LLDPE or a blend of LLDPE with a high pressure polyethylene;

Layer C: a high density polyethylene;

Layer D: same composition as Layer B; and

Layer E: same composition as Layer A.

* * * * *